(12) United States Patent
Plunkett et al.

(10) Patent No.: US 10,253,884 B2
(45) Date of Patent: Apr. 9, 2019

(54) GASKET HAVING UPPER AND LOWER ACTIVE LAYERS AND A SPACER LAYER

(71) Applicant: Dana Automotive Systems Group, LLC., Maumee, OH (US)

(72) Inventors: Thomas P. Plunkett, Aurora, IL (US); Ernest A. Oxenknecht, Naperville, IL (US); Michael J. Kestly, Danville, KY (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 48 days.

(21) Appl. No.: 15/507,347

(22) PCT Filed: Sep. 1, 2015

(86) PCT No.: PCT/US2015/047849
§ 371 (c)(1),
(2) Date: Feb. 28, 2017

(87) PCT Pub. No.: WO2016/036681
PCT Pub. Date: Mar. 10, 2016

(65) Prior Publication Data
US 2017/0248232 A1    Aug. 31, 2017

Related U.S. Application Data

(60) Provisional application No. 62/045,905, filed on Sep. 4, 2014.

(51) Int. Cl.
*F16J 15/08* (2006.01)
*F16J 15/06* (2006.01)

(52) U.S. Cl.
CPC ......... *F16J 15/0831* (2013.01); *F16J 15/061* (2013.01); *F16J 2015/085* (2013.01); *F16J 2015/0856* (2013.01)

(58) Field of Classification Search
CPC .............. F16J 15/0831; F16J 2015/085; F16J 2015/0856; F16J 15/061; E06B 7/2305
See application file for complete search history.

(56) References Cited

U.S. PATENT DOCUMENTS 2,135,807 A    11/1938  Fitzgerald
3,108,818 A    10/1963  Furstenburg
(Continued)

FOREIGN PATENT DOCUMENTS

DE    19637356 C1    1/1998
DE    202010006767 U1    9/2010
JP    57190738 A  *  11/1982  ............. B21D 39/03

OTHER PUBLICATIONS

International Search Report and Written Opinion, dated Nov. 25, 2015, Application No. PCT/US2015/047849, issued by the European Patent Office.

*Primary Examiner* — Eugene G Byrd
(74) *Attorney, Agent, or Firm* — Marshall & Melhorn, LLC

(57) ABSTRACT

A gasket (20) is provided with a uniform thickness spacer layer (66) between two metal upper active layers (78, 80) and two lower active layers (82,84). Each of the layers has aligned openings. A first tab (158, 140) is formed from one of the upper active layers and is located in a first slot (168) in the spacer layer. A second tab (132, 150) is formed in a flange of one of the upper active layers and is located in a second slot (174) located in the spacer layer. A third tab (190, 208) is formed from one of the lower active layers and is located in a third slot (212) located in the spacer layer. A fourth tab (176, 194) is formed in a flange of one of the lower active layers and is located in a fourth slot (218) located in the spacer layer.

16 Claims, 5 Drawing Sheets

(56) References Cited

U.S. PATENT DOCUMENTS

| | | | | |
|---|---|---|---|---|
| 3,573,873 | A | * | 4/1971 | Pearson ................ F16J 15/127 |
| | | | | 277/609 |
| 3,668,036 | A | | 6/1972 | Farnam |
| 5,083,801 | A | * | 1/1992 | Okano ................ F16J 15/061 |
| | | | | 277/598 |
| 5,087,058 | A | * | 2/1992 | Miura ................ F16J 15/0825 |
| | | | | 277/595 |
| 5,295,699 | A | * | 3/1994 | Inoue ................ F16J 15/0831 |
| | | | | 277/591 |
| 5,489,180 | A | * | 2/1996 | Ichihara ................ B32B 7/02 |
| | | | | 411/544 |
| 5,544,902 | A | * | 8/1996 | Belter ................ F16J 15/061 |
| | | | | 277/598 |
| 5,803,465 | A | * | 9/1998 | Schweiger ............ F16J 15/123 |
| | | | | 277/593 |
| 5,873,578 | A | * | 2/1999 | Jargeaix ............ F16J 15/0818 |
| | | | | 277/600 |
| 6,076,833 | A | * | 6/2000 | Geshi ................ F16J 15/0825 |
| | | | | 277/593 |
| 6,139,025 | A | * | 10/2000 | Miyaoh ................ F16J 15/0825 |
| | | | | 277/593 |
| 6,168,167 | B1 | | 1/2001 | Aoki |
| 6,259,609 | B1 | * | 7/2001 | Kurz ................ H05K 9/0016 |
| | | | | 361/753 |
| 6,332,618 | B1 | * | 12/2001 | Karlsson ............ H05K 9/0016 |
| | | | | 174/17 CT |
| 6,343,795 | B1 | | 2/2002 | Zerfass et al. |
| 6,746,020 | B2 | * | 6/2004 | Sumi ................ F02F 11/00 |
| | | | | 277/590 |
| 6,783,132 | B2 | | 8/2004 | Nakamura |
| 6,923,450 | B2 | | 8/2005 | Unseld et al. |
| 7,000,925 | B2 | | 2/2006 | Stapel et al. |
| 7,360,768 | B2 | | 4/2008 | Watanabe et al. |
| 7,889,515 | B2 | * | 2/2011 | Boetto ................ H05K 9/0016 |
| | | | | 174/350 |
| 8,500,131 | B2 | | 8/2013 | Schweiger |
| 8,608,178 | B2 | * | 12/2013 | Mori ................ F02F 11/00 |
| | | | | 277/594 |
| 8,695,986 | B2 | * | 4/2014 | Clemons ............ F16J 15/0825 |
| | | | | 277/592 |
| 2004/0262850 | A1 | * | 12/2004 | Matsushita .......... F16J 15/0831 |
| | | | | 277/592 |
| 2006/0192347 | A1 | | 8/2006 | Popielas |
| 2007/0090609 | A1 | * | 4/2007 | Kasuya ................ F16J 15/0825 |
| | | | | 277/598 |
| 2007/0290452 | A1 | * | 12/2007 | Matsushita .......... F16J 15/0825 |
| | | | | 277/595 |
| 2012/0139189 | A1 | * | 6/2012 | Schweiger .......... F01N 13/1827 |
| | | | | 277/594 |
| 2013/0106063 | A1 | * | 5/2013 | Schweiger .......... F16J 15/0825 |
| | | | | 277/591 |
| 2013/0106065 | A1 | * | 5/2013 | Schweiger .......... F16J 15/0825 |
| | | | | 277/594 |

* cited by examiner

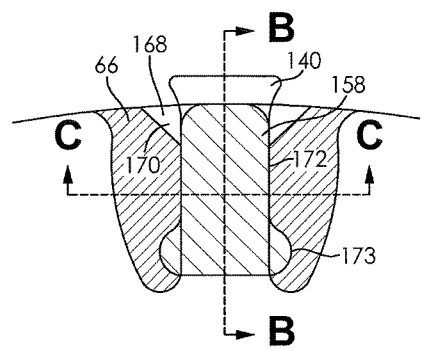
FIG. 10
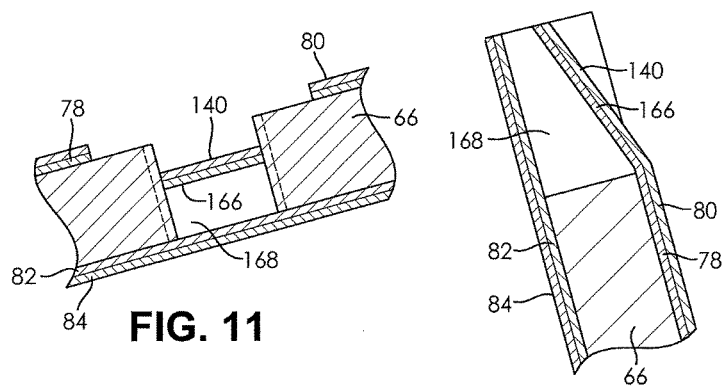
FIG. 11
FIG. 12
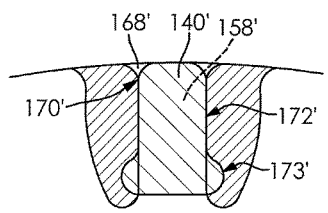
FIG. 13
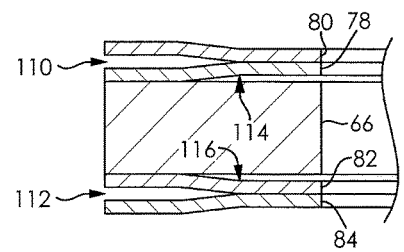
FIG. 14

US 10,253,884 B2

GASKET HAVING UPPER AND LOWER ACTIVE LAYERS AND A SPACER LAYER

RELATED APPLICATIONS

This application claims priority to and the benefit of U.S. Patent Application Ser. No. 62/045,905 filed on Sep. 4, 2014, which is incorporated by reference herein.

BACKGROUND OF THE INVENTION

Gaskets are well-known devices used to seal two mating surfaces, such as vehicle components. Gaskets may be comprised of multiple layers where each layer functions to create the seal. In many cases, the layers need to be held in a certain relationship to one another for them to optimally function. Further, the gasket must have features that prevent overcompression of the gasket, which can lead to its failure.

Based on the above, it would be advantageous to have a gasket that maintained the various gasket layers in the proper orientation and that also had features to that prevented overcompression of the gasket.

SUMMARY OF THE INVENTION

In one embodiment, a gasket is provided with a uniform thickness spacer layer between two metal upper active layers and two lower active layers. Each of the layers has aligned openings. A first tab is formed from one of the upper active layers and is located in a first slot in the spacer layer. A second tab is formed in a flange of one of the upper active layers and is located in a second slot located in the spacer layer. A third tab is formed from one of the lower active layers and is located in a third slot located in the spacer layer. A fourth tab is formed in a flange of one of the lower active layers and is located in a fourth slot located in the spacer layer.

DESCRIPTION OF THE DRAWINGS

FIG. 10 is Detail Z from FIG. 3;

FIG. 11 is Section C-C from FIG. 10;

FIG. 12 is Section B-B from FIG. 10;

FIG. 13 is an alternative embodiment to that shown in FIG. 10; and

FIG. 14 depicts the embodiment of FIG. 9 in a second state.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless the claims expressly state otherwise.

Figure 1:
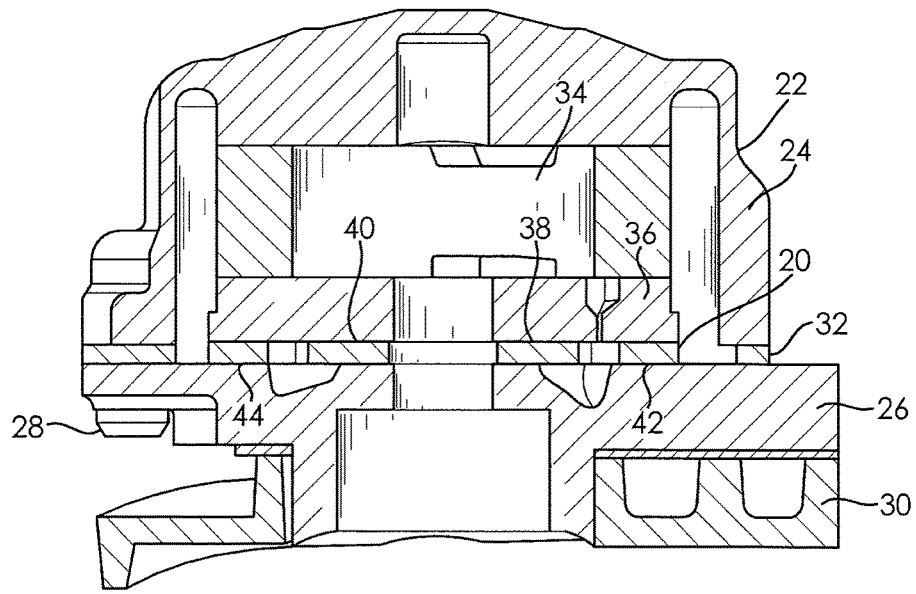
FIG. 1 is a cut away side view of one environment for the present invention.

Turning to FIG. 1, a side view of one embodiment of an environment for the subject gasket 20 is schematically depicted. The environment in this embodiment is for a transmission pump 22 as used in a vehicle (not shown).

The pump 22 comprises a pump body 24 attached to a cover plate 26, such as by mechanical fasteners 28. The cover plate 26 sits on a valve body 30. A first sealing material 32 may be located between the valve body 30 and the cover plate 26.

Housed within the pump body 24 are at least the following components: a cam ring 34, a pressure plate 36 located directly beneath and in contact with the cam ring 34 and the subject gasket 20 located directly beneath and in contact with the pressure plate 36. The gasket 20 is sandwiched between the pressure plate 36 and the cover plate 26. In other words, the gasket 20 has an upper surface 38 in direct contact with a lower surface 40 of the pressure plate 36 and the gasket 20 has a lower surface 42 in direct contact with an upper surface 44 of the cover plate 26.

Figure 2:
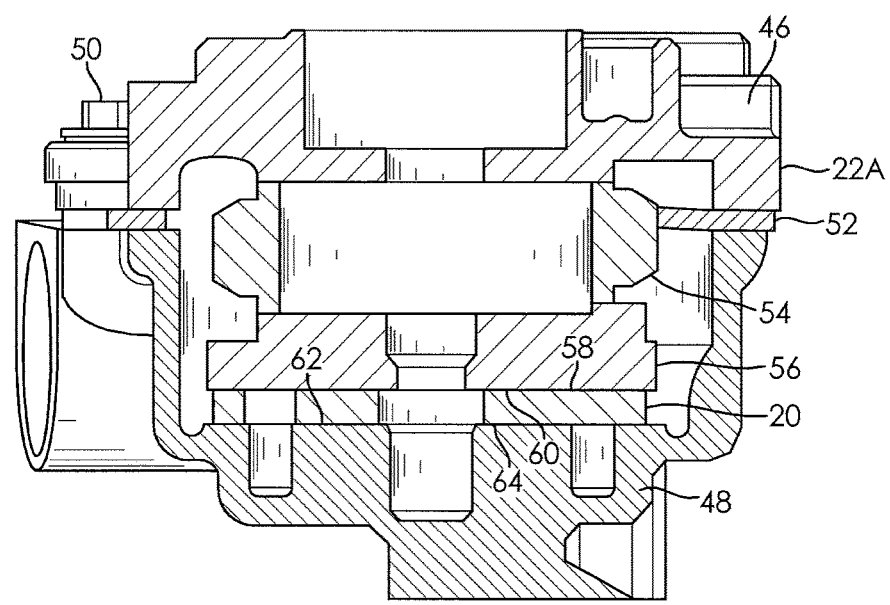
FIG. 2 is a cut away side view of another environment for the present invention.

FIG. 2 depicts an alternative transmission pump 22A for the gasket 20. In FIG. 2, a pump cover 46 is connected to a valve body 48, such as by mechanical fasteners 50. A first sealing material 52 may be located between the cover 46 and the valve body 48. A cam ring 54 is housed within the pump cover 46 and the valve body 48. A pressure plate 56 is located directly beneath and in contact with the cam ring 54. The gasket 20 is sandwiched between the pressure plate 56 and the valve body 48. More particularly, the gasket 20 has an upper surface 58 in direct contact with a lower surface 60 of the pressure plate 56 and the gasket 20 has a lower surface 62 in direct contact with an upper surface 64 of the valve body 48.

One embodiment of a gasket 20 that may be used with transmission pump 22 or 22A is described below. While the gasket 20 may be used for transmission pumps, it is not limited to only use with such pumps. Instead, it may be used in any environment where a seal is needed between two surfaces.

Figure 3:
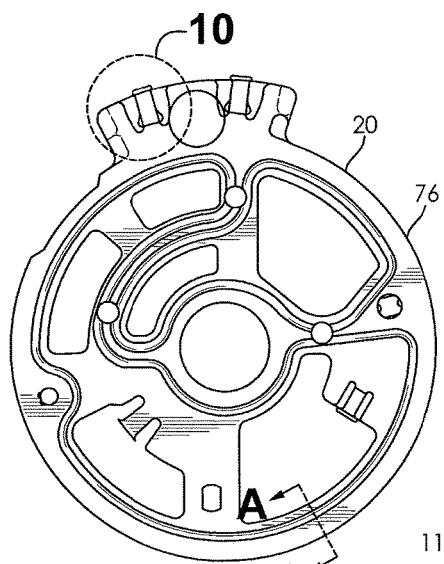
FIG. 3 is a top plan view of one embodiment of the present invention.
Figure 6:
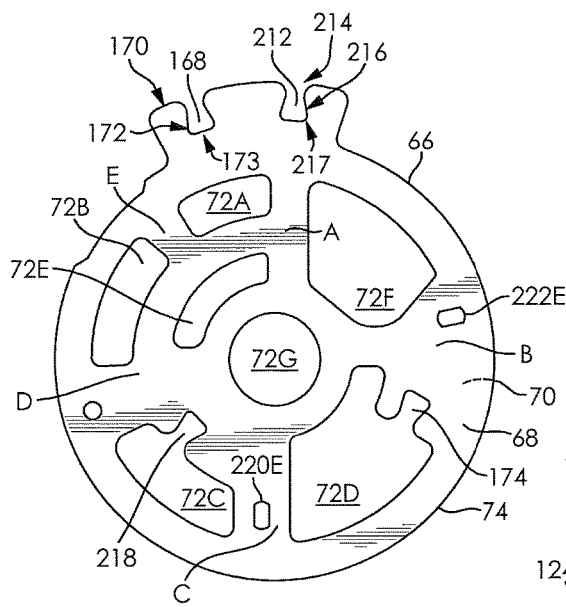
FIG. 6 is a top plan view of another layer of the invention depicted in FIG. 3.
Figure 9:
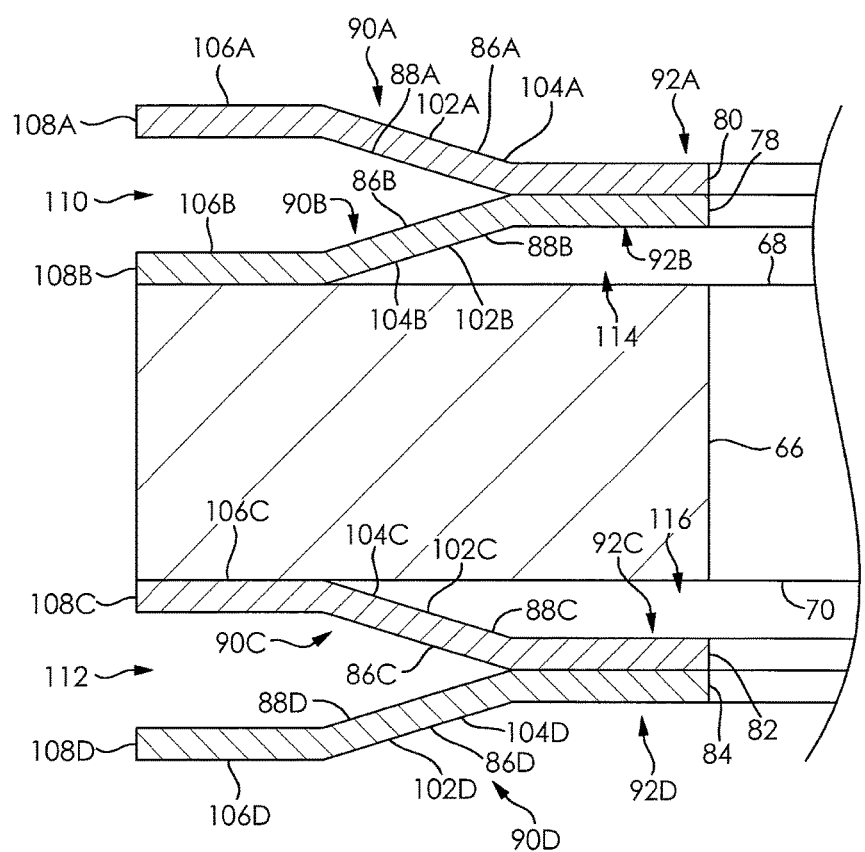
FIG. 9 is Section A-A from FIG. 3.

One embodiment of an assembled gasket 20 is depicted in FIG. 3. The gasket 20 is comprised of 5 layers. One of the layers is a spacer layer 66, also shown in FIGS. 6 and 9. As shown in FIG. 9, the spacer layer 66 is sandwiched between two upper active layers (described below) and two lower active layers (described below). The spacer layer 66, as also shown in FIG. 6, has a planar upper surface 68 and a planar lower surface 70. The upper and lower spacer layer surfaces 68, 70 are parallel to one another; thus, the spacer layer 66 has a uniform thickness. Preferably, the spacer layer 66 is a single, uniform, unitary, integrally formed layer of a single material. In one embodiment, the material may be such as a low carbon steel. More particularly, the steel may be such as SAEJ403.

The spacer layer 66 extends across the entire gasket 20, except where a plurality of fluid apertures 72A-G extends through the layer 66 from the upper surface 68 to the lower surface 70 of the layer 66. The spacer layer 66 has an outer perimeter 74 that extends around the entire perimeter 76 of the gasket 20 and contributes to define the gasket perimeter 76, which can be appreciated in FIG. 3.

Figure 5:
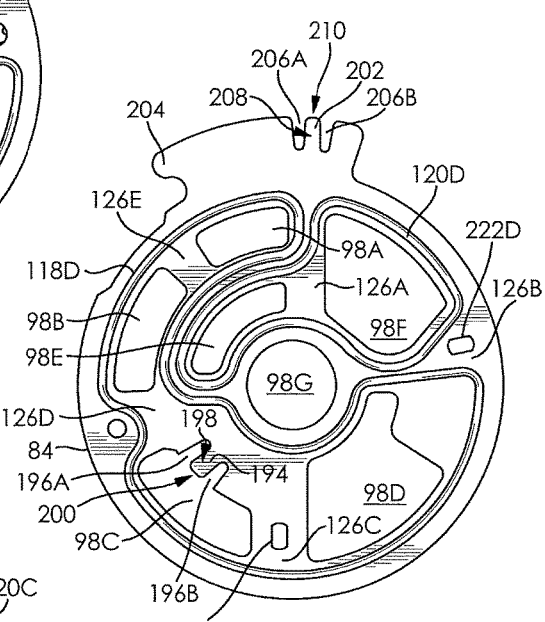
FIG. 5 is a top plan view of another layer of the invention depicted in FIG. 3.
Figure 4:
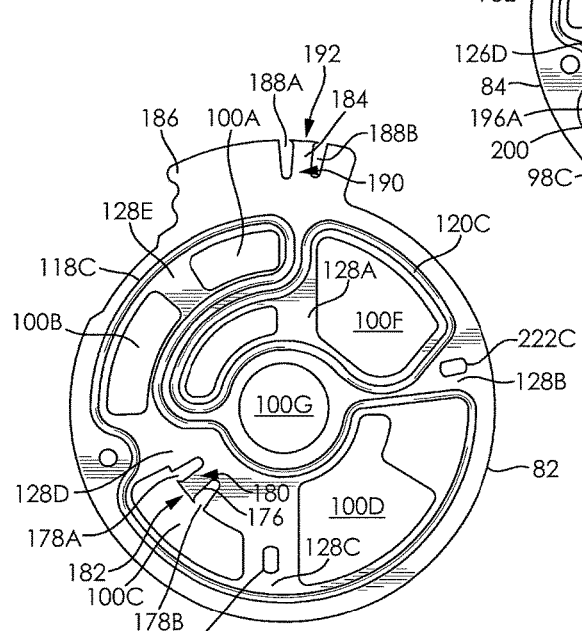
FIG. 4 is a top plan view of one layer of the invention depicted in FIG. 3.
Figure 8:
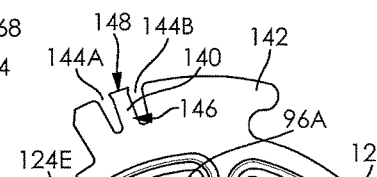
FIG. 8 is a top plan view of another layer of the invention depicted in FIG. 3.
Figure 8:
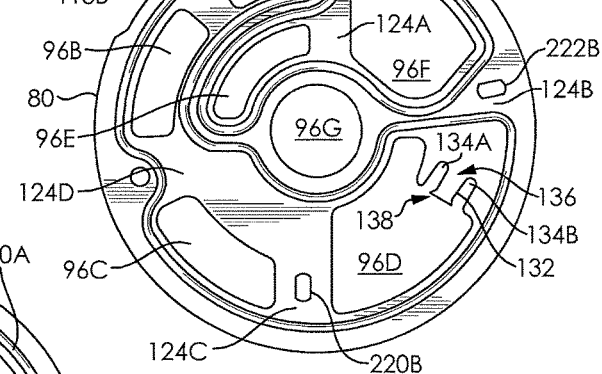
Figure 7:
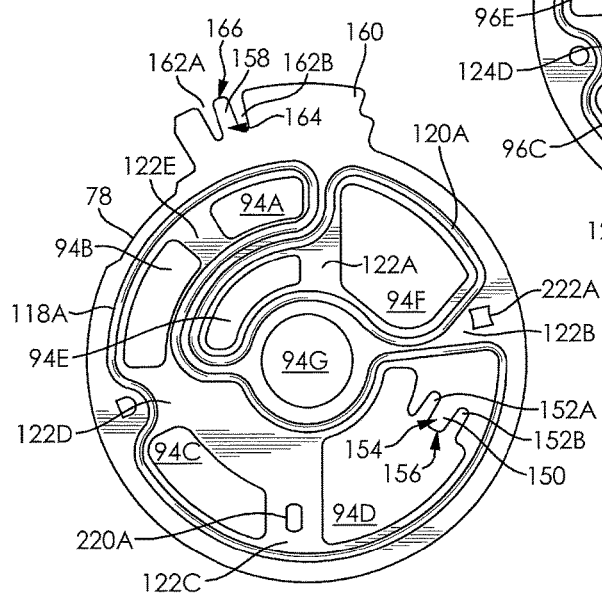
FIG. 7 is a top plan view of another layer of the invention depicted in FIG. 3.

The two upper active layers 78, 80 are shown in FIGS. 7 and 8. The layers 78, 80 are comprised of an inboard active sheet 78 (shown in FIG. 7) and an outboard active sheet 80 (shown in FIG. 8). The two lower active layers 82, 84, shown in FIGS. 4 and 5, are comprised of an inboard active sheet 82 and an outboard active sheet 84. While each sheet 78, 80, 82, 84 may be comprised of metal and rubber, each sheet 78, 80, 82, 84 is considered a single, stand alone, unitary layer because the rubber is securely attached to the metal.

It can be appreciated from FIG. 9 that each of the sheets 78, 80, 82 84 has a first surface 86A-D, a second surface 88A-D, an outer portion 90A-D and an inner portion 92A-D. Each first surface 86A-D and each second surface 88A-D of each inner portion 92A-D are substantially planar and parallel one another, thus the thicknesses of the inner portions 92A-D are constant. Each of the first surfaces 86A-D and the second surfaces 88A-D of the inner portions 92A-D are also parallel to the upper surface 68 and the lower surface 70 of the spacer layer 66.

Each of the inner portions of the 92A-D extend inwardly across the entire gasket 20, except where a plurality of fluid apertures 94A-G, 96A-G, 98A-G, 100A-G extends through the sheets 78, 80, 82, 84 from their respective first surfaces 86A-D to the second surfaces 88A-D as described below. The fluid apertures 94A-G, 96A-G, 98A-G, 100A-G have the same locations through each of the sheets 78, 80, 82, 84, and the fluid apertures 94A-G, 96A-G, 98A-G, 100A-G in the sheets 78, 80, 82, 84 are axially and radially aligned with the fluid apertures 72A-G in the spacer layer 66, which can be appreciated in FIG. 3. All of the fluid apertures 94A-G, 96A-G, 98A-G, 100A-G, 72A-G in the sheets 78, 80, 82, 84 and the spacer layer 66 have a complementary shape to one another, which can be appreciated in FIGS. 3-8.

Each of the sheets 78, 80, 82, 84 may have the same construction. Namely, each sheet 78, 80, 82, 84 may be a rubber coated metal. The metal may be such as SS301 and the coating may be such as a fluoroelastomer. Each sheet 78, 80, 82, 84 may have a total thickness of approximately 0.20 mm. The metal thickness maybe approximately 0.15 mm and the coating thickness may be approximately 0.025 mm on each side of the metal.

As shown in FIG. 9, the inner portions 92A-B of the upper active sheets 78, 80 are in direct contact with one another. More particularly, the second surface 88A of the outboard active sheet 80 and the first surface 86B of the inboard active sheet 78 are in direct facing contact with one another.

Similarly, the inner portions 92C-D of the lower active sheets 82, 84 are in direct contact with one another. More particularly, the second surface 88D of the outboard active sheet 84 and the first surface 86C of the inboard active sheet 82 are in direct facing contact with one another.

Radially outboard of each inner portion 92A-D of each sheet 78, 80, 82, 84 are the outboard portions 90A-D of the sheets 78, 80, 82, 84. The outer portions 90A, 90D of the outboard active sheets 80, 84 are comprised of half beads 102A, D. The half beads 102A, D each have a ramp portion 104A, D and a planar portion 106A, D. The ramp portions 104A, D are directly connected to the inboard portions of the respective sheets 80, 84. The ramp portions 104A, D extend at an angle away from the inboard portion and away from the spacer layer 66. At one end, the planar portions 106A, D are directly connected to the ramp portions 104A, D. The planar portions 106A, D are parallel to the upper and lower surfaces 68, 70 of the spacer layer 66. At an opposite end, each planar portion 106A, D terminates at an end edge 108A, D. Each end edge 108A, D is radially aligned with the spacer layer outer perimeter 74 and contributes to define the gasket perimeter 76.

The outer portion 90B, C of each inboard active sheet 78, 82 is comprised of a half bead 102B, C. Each half bead 102B, C has a ramp portion 104B, C and a planar portion 106B, C. Each ramp portion 104B, C extends at an angle away from the inboard portion and toward the spacer layer 66. At one end, the planar portions 106B, C are directly connected to the ramp portions 104B, C. The planar portions 106B, C are parallel to the upper and lower surfaces 68, 70 of the spacer layer 66. At an opposite end, each planar portion 106B, C terminates at an end edge 108B, C. Each end edge 108B, C is radially aligned with the spacer layer outer perimeter 74 and contributes to define the gasket perimeter 76.

The second surfaces 88B, C of the outer portions 90B, C of the inboard active sheets 78, 82 are in direct contact with the upper and lower surfaces 68, 70, respectively, of the spacer layer 66.

With continued reference to FIG. 9, a first gap 110 exists between the outer portions 90A, B of the outboard active sheet 80 and the inboard active sheet 78. More particularly, the first gap 110 exists between the second surface 88A of the outboard active sheet 80 and the first surface 86B of the inboard active sheet 78.

A second gap 112 exists between the outer portions 90C, D of the outboard active sheet 84 and the inboard active sheet 82. More particularly, the second gap 112 exists between the second surface 88D of the outboard active sheet 84 and the first surface 86C of the inboard active sheet 82.

A third gap 114 exists between the second surface 88B of the inboard active sheet 78 and the upper surface 68 of the spacer layer 66. A fourth gap 116 exists between the second surface 88C of the inboard active sheet 82 and the lower surface 70 of the spacer layer 66.

From FIGS. 3-5 and 7-8, it can be appreciated by following the bead lines that there are two sections of the gasket 20 that are sealed from one another. More particularly, each sheet 78, 80, 82, 84 has a first bead 118A-D, respectively. Inboard active sheet 78 has a first bead 118A that seals apertures 94A, B, C, D and G. Outboard active sheet 80 has a first bead 118B that seals apertures 96A, B, C, D and G. Inboard active sheet 82 has a first bead 118C that seals apertures 100 A, B, C, D and G. Outboard active sheet 84 has a first bead 118D that seals apertures 98A, B, C, D and G. The beads 118A-D have an identical shape, size and location to one another on their respective sheets.

Each sheet 78, 80, 82, 84 has a second bead 120A-D, respectively. Inboard active sheet 78 has a second bead 120A that seals apertures 94F, E and G. Outboard active sheet 80 has a second bead 120B that seals apertures 96F, E and G. Inboard active sheet 82 has a second bead 120C that seals apertures 100F, E and G. Outboard active sheet 84 has a second bead 120D that seals apertures 98F, E and G. The beads 120A-D have an identical shape, size and location to one another on their respective sheets.

The apertures 94A-G, 96A-G, 98A-G and 100A-G are separated from one another by spokes. More particularly, the apertures 94A-G of the upper active sheet 78 are separated by spokes 122A-E, as shown in FIG. 7. The apertures 96A-G of the upper active sheet 80 are separated by spokes 124A-E, as shown in FIG. 8. The apertures 98A-G of the lower active sheet 82 are separated by spokes 126A-E, as shown in FIG. 5. And, the apertures 100A-G of the lower active layer 84 are separated by spokes 128A-E, as shown in FIG. 4 The spokes 122A-E, 124A-E, 126A-E and 128A-E have an identical shape, size and location to one another on their respective sheets. Similarly, the spacer layer 66 has spokes A-E that separate its apertures 72, as shown in FIG. 6.

As shown in FIG. 8, upper outboard active sheet 80 has a locking tab 132 on spoke 124B. The locking tab extends into aperture 96D. Recesses 134A, 134B are on either side of the locking tab 132. The locking tab 132 has a body portion 136 and an end portion 138. The end portion 138 is preferably flared so as to have a width greater than a width of the body portion 136.

The upper outboard active sheet 80 also has a locking tab 140 on a flange 142. The flange locking tab 140 is on an outer periphery of the flange 142. Recesses 144A, B are on either side of the flange locking tab 140. The flange locking tab 140 has a body portion 146 and an end portion 148. The end portion 148 is preferably flared so as to have a width greater than a width of the body portion 146.

The locking tabs 132, the flange locking tab 140 and the flange 142 are preferably one-piece, integrally formed and unitary with the sheet 80.

As shown in FIG. 7, the upper inboard active sheet 78 has a locking tab 150 on spoke 122B. The locking tab 150 extends into aperture 94D. Recesses 152A, B are on either side of the locking tab 150. The locking tab 150 has a body portion 154 and an end portion 156 of substantially the same width.

The upper inboard active sheet 78 also has a locking tab 158 on a flange 160. The locking tab 158 is on an outer periphery of the flange 160. Recesses 162A, B are on either side of the locking tab 158. The locking tab 158 has a body portion 164 and an end portion 166 of substantially the same width.

The locking tab 150, the flange locking tab 158 and the flange 160 are preferably one-piece, integrally formed and unitary with the sheet 80.

The flange locking tabs 140, 158 are also shown in FIGS. 10-12. From these figures, it can be appreciated that the tabs 140, 158 are designed to contact one another, where locking tab 140 is designed to come in contact with locking tab 158 substantially along their lengths and widths. Locking tab 140 extends radially beyond locking tab 158.

The tabs 140, 158 are coined, or bent, so that together they extend into a first slot 168 formed in the spacer layer 66. The first slot 168 may have an hourglass-type shape with a wide opening 170, a narrow body 172 and a flared end portion 173. The tabs 140, 158 located in the spacer layer first slot 168 to lock the layers 78, 80 to the spacer layer 66. More particularly, the tabs 140, 158, located in the spacer layer first slot 168, function to close around the spacer layer 66.

The locking tabs 132, 150 work in the same fashion as the flange locking tabs 140, 158. Namely, they extend in a similar fashion into a second slot 174 in the spacer layer 66. The second slot 174 has substantially the same shape and size as the first slot 168, as shown in FIG. 6.

As shown in FIG. 4, lower outboard active sheet 82 has a locking tab 176 on spoke 128C. The locking tab 176 extends into aperture 100C. Recesses 178 A, B are on either side of the locking tab 176. The locking tab 176 has a body portion 180 and an end portion 182. The end portion 182 is preferably flared so as to have a width greater than a width of the body portion 180.

The lower outboard active sheet 82 also has a locking tab 184 on a flange 186. The flange locking tab 184 is on an outer periphery of the flange 186. Recesses 188A, B are on either side of the flange locking tab 184. The flange locking tab 184 has a body portion 190 and an end portion 192. The end portion 192 is preferably flared so as to have a width greater than a width of the body portion 190.

The locking tab 176, the flange locking tab 184 and the flange 186 are preferably one-piece, integrally formed and unitary with the sheet 84.

As shown in FIG. 5, the lower inboard active sheet 84 has a locking tab 194 on spoke 126D. The locking tab 194 extends into aperture 98C. Recesses 196A, B are on either side of the locking tab 194. The locking tab 194 has a body portion 198 and an end portion 200 of substantially the same width. The lower inboard active sheet 82 also has a locking tab 202 on a flange 204. The flange locking tab 202 is on an outer periphery of the flange 204. Recesses 206A, B are on either side of the flange locking tab 202. The flange locking tab 202 has a body portion 208 and an end portion 210 of substantially the same width.

The locking tab 194, the flange locking tab 202 and the flange 204 are preferably one-piece, integrally formed and unitary with the sheet 82.

The flange locking tabs 184, 202 are the same as those shown in FIGS. 10-12. From these figures, it can be appreciated that the flange locking tabs 184, 202 are designed to contact one another, where locking tab 184 is designed to come in contact with locking tab 202 substantially along their lengths and widths. Locking tab 184 extends radially beyond locking tab 202.

The tabs 184, 202 are coined, or bent, so that together they extend into a third slot 212 formed in the spacer layer 66. The third slot 212 may have an hourglass-type shape with a wide opening 214, a narrow body 216 and a flared end portion 217. The tabs 184, 202 located in the spacer layer third slot 212 lock the layers 82, 84 to the spacer layer 66. More particularly, the tabs 184, 202, located in the spacer layer third slot 212, function to close around the spacer layer 66.

The locking tabs 176, 194 work in the same fashion as the flange locking tabs 184, 202. Namely, they extend in a similar fashion into a fourth slot 218 in the spacer layer 66. The fourth slot 218 has the same features as the third slot 212.

FIG. 13 depicts an alternative embodiment to the embodiment shown in FIG. 10. In FIG. 13, the spacer layer slot 168' has a narrow body portion 172' and a flared end portion 173', like that depicted in FIG. 10. The slot 168', however, has a narrower opening 170' than the flared opening 170 in FIG. 10.

Additionally, the tabs 140', 158' have substantially the same shape and radial dimension. In other words, one tab 140', 158' does not extend substantially radially beyond the other and one tab 140', 158' does not have a flared end. Instead, the tabs 140', 158' are complementary to one another. The tabs 140', 158' function substantially the same as described above for the tabs 140, 158.

Based on the foregoing, it can be appreciated that the gasket 20 is not symmetrical about any axis or for any of its sheets 78, 80, 82, 84 or spacer layer 66.

First and second dowel holes 220A-E, 222A-E extend through each of the sheets 78, 80, 82, 84, and the spacer layer 66. The shape of one of the dowel holes 220A-E, 222A-E may be non-round, such as oval or abround, to provide some play for the gasket 20 to be installed on dowels (not shown). Two fingers (not shown) may extend into one of the dowel holes 220A-E, 222A-E, such as from the spacer layer 66, to hold into a dowel received in the hole 220A-E, 222A-E. The dowel holes 220A-E, 222A-E receive dowels from the pump housing for locating the gasket 20 thereon.

FIG. 14 depicts the gasket 20 in the installed condition. In the installed condition, the gasket 20 is compressed and the gaps 110, 112, 114, 116 are reduced compared to their heights in FIG. 9, but the gaps 110, 112, 114, 116 are still present even in the installed condition.

Maintaining the gaps 110, 112, 114, 116 in the installed condition permit the gasket 20 to operate in a large operating range of pressures, including higher than normal operating pressures. By way of example, a traditional pump operating pressure might be in the range of 300 psi. The present gasket 20 can operate at pressures up to 480 psi due to the above-described features.

The above-described features also prevent loads from being transferred through the gasket 20 to the pump body or valve body. More particularly, because the gaps 110, 112, 114, 116 are maintained through the sheets 78, 80, 82, 84 and the sheets 78, 80, 82, 84 are not in complete contact with one another, loads are not transferred through the gasket 20. The gaps 110, 112, 114, 116 in the sheets 78, 80, 82, 84 also advantageously accommodate tolerance stack ups in the pump.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket, comprising:
   a spacer layer sandwiched between two metal upper active layers and two metal lower active layers, wherein said metal upper active layers comprise an upper inboard active sheet and an upper outboard active sheet and said metal lower active layers comprise a lower inboard active sheet and a lower outboard active sheet;
   a first tab integrally formed from a flange portion of said upper outboard active sheet and a second tab integrally formed from a spoke portion of said upper outboard active sheet, wherein one of said first or second tabs has a flared end portion;
   a third tab integrally formed from a flange portion of said upper inboard active sheet and a fourth tab integrally formed from a spoke portion of said upper inboard active sheet, wherein one of said third or fourth tabs has a flared end portion;
   a fifth tab integrally formed from a flange portion said lower outboard active sheet and a sixth tab integrally formed from a spoke portion of said lower outboard active sheet, wherein one of said fifth or sixth tabs has a flared end portion; and
   a seventh tab integrally formed from a flange portion of said lower inboard active sheet and an eighth tab integrally formed from a spoke portion of said lower inboard active sheet, wherein one of said seventh or eighth tabs has a flared end portion.

2. The gasket of claim 1, wherein said first and third tabs are located in a first slot in a flange portion of said spacer layer.

3. The gasket of claim 1, wherein said second and fourth tabs are located in a second slot in a spoke portion of said spacer layer.

4. The gasket of claim 2, wherein said fifth and seventh tabs are located in a third slot in a flange portion of said spacer layer.

5. The gasket of claim 3, wherein said sixth and eighth tabs are located in a fourth slot in a spoke portion of said spacer layer.

6. The gasket of claim 4, wherein said first slot and said third slot are circumferentially spaced from one another along said spacer layer flange portion.

7. The gasket of claim 5, wherein said spoke portions in each of said spacer layer, said metal upper active layers and said metal lower active layers separate apertures in each of said layers.

8. The gasket of claim 7, wherein the tabs are separated by the apertures.

9. The gasket of claim 1, wherein recess are located on either side of each of said tabs.

10. The gasket of claim 6, wherein said slots have a hourglass shape.

11. The gasket of claim 2, wherein at least some of the tabs overlap with edges of the spacer layer slots to lock the layers to the spacer layer.

12. The gasket of claim 1, wherein each sheet has an outer portion and an inner portion.

13. The gasket of claim 12, wherein said inner portions of said sheets are planar, parallel and in facing contact with one another.

14. The gasket of claim 13, wherein said outer portions of said sheets each have a half bead aligned with one another wherein a gap separates each half bead.

15. The gasket of claim 1, wherein said flared end portions extend radially beyond their respective layers.

16. The gasket of claim 15, wherein said flared end portions extend axially beyond slots in said layers.

* * * * *